No. 825,012. PATENTED JULY 3, 1906.
G. W. TALLMAN.
HEAT RETAINING RECEPTACLE.
APPLICATION FILED JAN. 9, 1905. RENEWED JUNE 5, 1906.
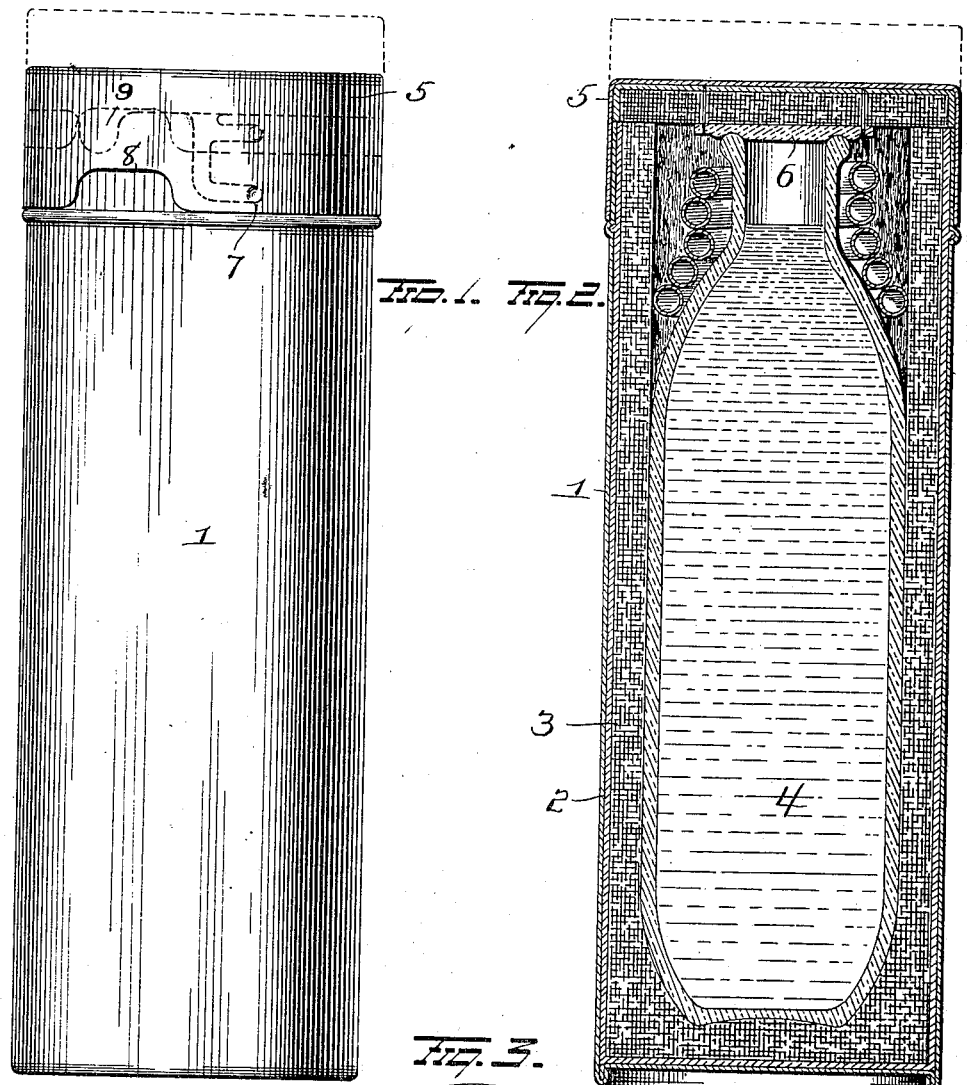
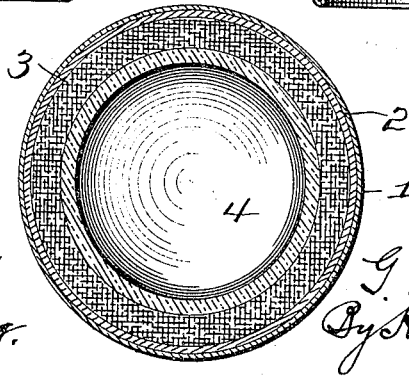

UNITED STATES PATENT OFFICE.

GEORGE W. TALLMAN, OF NEW YORK, N. Y.

HEAT-RETAINING RECEPTACLE.

No. 825,012.　　　　Specification of Letters Patent.　　　　Patented July 3, 1906.

Application filed January 9, 1905. Renewed June 5, 1906. Serial No. 320,342.

*To all whom it may concern:*

Be it known that I, GEORGE W. TALLMAN, of New York, in the county of New York and State of New York, have invented certain new and useful Improvements in Heat-Retaining Receptacles; and I do hereby declare the following to be a full, clear, and exact description of the invention, such as will enable others skilled in the art to which it appertains to make and use the same.

My invention relates to improvements in heat-retaining receptacles for bottles, and more particularly to a device for keeping warm the contents of a nursing-bottle, the object of the invention being to provide a simple portable receptacle within which a nursing-bottle can be inclosed, said receptacle being so constructed that the heat of the contents of the bottle will be retained therein for a considerable length of time.

A further object is to construct the device in such manner that a nursing-bottle inclosed therein can (through the medium of a tube) be used without removing the bottle from the receptacle and without any inconvenience to the infant or the nurse.

With these objects in view the invention consists in certain novel features of construction and combinations and arrangements of parts, as hereinafter set forth, and pointed out in the claims.

In the accompanying drawings, Figure 1 is a view of my improvement. Fig. 2 is a longitudinal sectional view. Fig. 3 is a transverse sectional view.

1 represents a sheet-metal casing which will be constructed in a shape corresponding with the general contour of the nursing-bottle to be inclosed. In the drawings I have shown the casing 1 cylindrical in form to receive a nursing-bottle having a general cylindrical shape. Within the cylindrical shell or casing 1 a lining 2 of asbestos is placed in contact with the wall thereof and also on the bottom. An inner lining 3, of felt or similar material, is located against the asbestos lining 2 and is made of such thickness that it will closely embrace the bottle 4. The bottom of the shell is also covered with felt and on this the bottom of the bottle rests.

The cover 5 of the receptacle is lined with asbestos and felt, the same as the body of the receptacle, and within said cover is also placed a disk 6, of sheet-rubber or other suitable material, which when the cover is in place will engage the mouth of the bottle and serve as a closure therefor. The depending flange of the cover is provided with one or more inwardly-projecting teats 7, which enter angular grooves in the body of the casing, near the top thereof, for the purpose of securing the cover in place and pressing it against the mouth of the bottle. The flange of the cover is also provided with a semicircular notch 8, and the upper edge of the casing and the linings thereof are also recessed or notched, as at 9, so that when the notch of the cover alines with those of the casing and lining a circular opening will be formed. Through this opening a nursing-tube may be made to project, and thus the use of the bottle by the infant will be permitted without the necessity of removing the bottle from the receptacle.

The device is light in weight, occupies but little more space than a nursing-bottle, can be readily handled by the infant, and can be easily stowed away beneath a pillow when not in use and the contents of the bottle kept warm.

My improvements are very simple in construction, can be sold at a reasonable figure, and are effectual in every respect in the performance of the functions for which they are intended.

Slight changes might be made in the details of construction of the device without departing from the spirit of my invention or limiting its scope, and hence I do not wish to limit myself to the exact details herein set forth.

Having fully described my invention, what I claim as new, and desire to secure by Letters Patent, is—

1. An inclosure for a nursing-bottle, comprising an outer shell, a removable cover, an inner heat-retaining lining arranged to closely embrace a removable nursing-bottle after the cover has been removed, said heat-retaining lining adapted to contact with the bottom of the bottle, a heat-resisting lining interposed between the inner lining and the shell, a similar lining in the cover, and a stopper for the nursing-bottle secured to the lining of the cover.

2. An inclosure for a nursing-bottle, comprising an outer shell and linings of heat-resisting and heat-retaining materials, and a cover, said cover and shell constructed to permit the passage of a tube attached to the bottle, and means for retaining the cover on the shell with the tube passing through the cover and shell and also for retaining the cover in place when the tube is inclosed within the shell.

3. An inclosure constructed to contain a nursing-bottle and a nursing-tube, said closure comprising a shell having a lining to embrace the bottle and retain heat therein, and an adjustable cover, said shell and cover having openings normally out of alinement, means for holding the cover in such position, and means for holding the cover in place on the shell when said openings are brought into alinement with each other for the passage of the nursing-tube.

In testimony whereof I have signed this specification in the presence of two subscribing witnesses.

GEORGE W. TALLMAN.

Witnesses:
R. S. FERGUSON,
GEORGE F. DOWNING.